United States Patent
Onyekwelu et al.

(10) Patent No.: US 11,206,270 B2
(45) Date of Patent: Dec. 21, 2021

(54) AUTOMATIC MANAGEMENT OF DIGITAL CONTENT ACCESS

(71) Applicant: INTERNATIONAL BUSINESS MACHINES CORPORATION, Armonk, NY (US)

(72) Inventors: Adaoha Onyekwelu, Wappingers Falls, NY (US); Tyler Nicole King, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 281 days.

(21) Appl. No.: 16/545,144

(22) Filed: Aug. 20, 2019

(65) Prior Publication Data
US 2021/0058402 A1    Feb. 25, 2021

(51) Int. Cl.
*G06F 21/62* (2013.01)
*H04L 29/06* (2006.01)

(52) U.S. Cl.
CPC ........ *H04L 63/105* (2013.01); *G06F 21/6218* (2013.01); *H04L 63/0861* (2013.01)

(58) Field of Classification Search
CPC .. G06F 21/6218; G06F 16/9536; G06F 21/32; H04L 63/105
See application file for complete search history.

(56) References Cited

U.S. PATENT DOCUMENTS

| 6,519,412 | B1  |   | 2/2003  | Kim |
|-----------|-----|---|---------|-----|
| 7,133,792 | B2  |   | 11/2006 | Murakami |
| 7,370,208 | B2  |   | 5/2008  | Levin |
| 9,674,579 | B1  | * | 6/2017  | Jaini ................. H04N 21/6582 |
| 10,212,158| B2  |   | 2/2019  | Han |
| 2007/0098235 | A1 |   | 5/2007 | Halavee |
| 2008/0168548 | A1 |   | 7/2008 | O'Brien |
| 2009/0064314 | A1 |   | 3/2009 | Lee |
| 2009/0133051 | A1 | * | 5/2009 | Hildreth ............ H04N 21/4223 725/28 |
| 2013/0111312 | A1 |   | 6/2013 | Karmarkar |
| 2018/0352301 | A1 | * | 12/2018| Tofighbakhsh ...... H04N 21/252 |

* cited by examiner

*Primary Examiner* — Olugbenga O Idowu
(74) *Attorney, Agent, or Firm* — Cantor Colburn LLP; Teddi Maranzano

(57) ABSTRACT

A computer-implemented method includes creating a family profile for an automatic content filtering system, the family profile identifying a restricted account and a non-restricted account. The method further includes restricting, by the content filtering system, access to a digital content according to a set of rules, the restricting in response to receiving a request from the restricted account. The method further includes updating, by the content filtering system, the set of rules in response to the unrestricted account authorizing the restricted account to access the digital content that was restricted by the automatic content filtering system.

17 Claims, 6 Drawing Sheets

| Tolerance score | 1 | 2 | 3 | 4 | 5 | 6 | 7 | 8 | 9 |
|---|---|---|---|---|---|---|---|---|---|
| Approximate age of user | 0 | 3 | 6 | 10 | 12 | - | 15 | 17 | 18 |
| Japan | |  |  | |  | |  |  |  |
| North America/Central America and South America† | |  |  |  |  | | | |  |
| Europe*/Africa*/India | |  |  | |  | |  | |  |

AUTOMATIC MANAGEMENT OF DIGITAL CONTENT ACCESS

BACKGROUND

The present invention relates generally to computer technology, and more particularly to a digital content filtering system that automatically manages access to digital content by continuously learning a tolerance level score for one or more users.

Popularity of digital media has increased, and still is increasing. Users of all ages, young children, teenagers, youth, as well as adults rely on digital content for infotainment today. For example, users access books, movies, articles, papers, and news, as well as various other audio, video, and visual content in a digital format. The digital format can be online, such as streaming via the Internet, or offline, such as on disks, or any other electronic format. With a vast collection of digital content available, filtering access to the digital content for users of different age groups is needed, particularly when the digital content is being accessed without adult supervision.

SUMMARY

A computer-implemented method includes creating a family profile for an automatic content filtering system, the family profile identifying a restricted account and a non-restricted account. The method further includes restricting, by the content filtering system, access to a digital content according to a set of rules, the restricting in response to receiving a request from the restricted account. The method further includes updating, by the content filtering system, the set of rules in response to the unrestricted account authorizing the restricted account to access the digital content that was restricted by the automatic content filtering system. The above-described features can also be provided at least by a system, a computer program product, and a machine, among other types of implementations.

According to one or more embodiments of the present invention a system includes a memory, and a processor coupled with the memory. The processor performs a method that includes creating a family profile for an automatic content filtering system, the family profile identifying a restricted account and a non-restricted account. The method further includes restricting, by the content filtering system, access to a digital content according to a set of rules, the restricting in response to receiving a request from the restricted account. The method further includes updating, by the content filtering system, the set of rules in response to the unrestricted account authorizing the restricted account to access the digital content that was restricted by the automatic content filtering system. The above-described features can also be provided at least by a system, a computer program product, and a machine, among other types of implementations.

According to one or more embodiments of the present invention a computer program product having a memory storage device that has computer executable instructions stored thereon. The computer executable instructions when executed by a processor cause the processor to perform a method that includes creating a family profile for an automatic content filtering system, the family profile identifying a restricted account and a non-restricted account. The method further includes restricting, by the content filtering system, access to a digital content according to a set of rules, the restricting in response to receiving a request from the restricted account. The method further includes updating, by the content filtering system, the set of rules in response to the unrestricted account authorizing the restricted account to access the digital content that was restricted by the automatic content filtering system. The above-described features can also be provided at least by a system, a computer program product, and a machine, among other types of implementations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
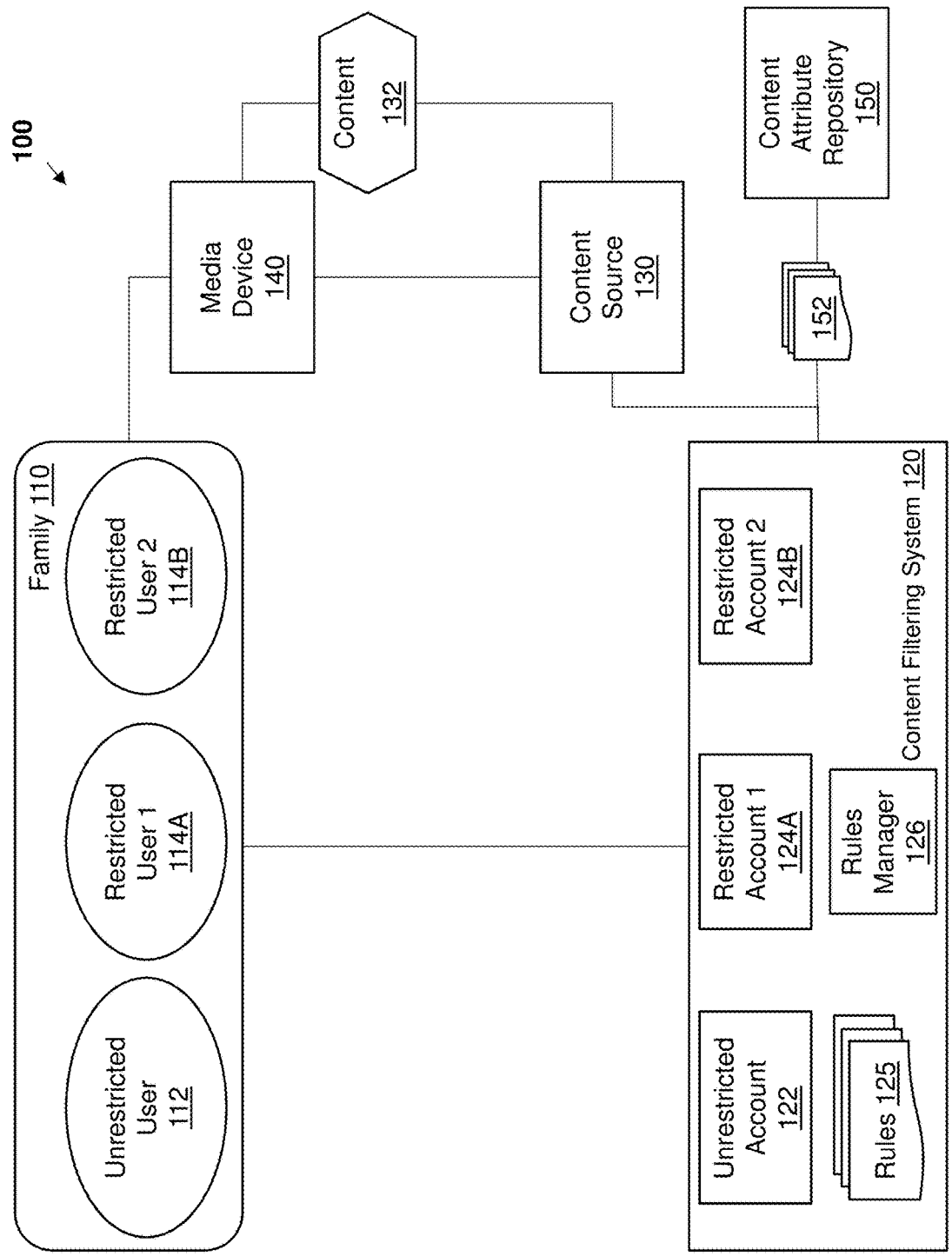
FIG. 1 depicts a system that manages digital content access for a family according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

While parents try to teach their child what's best when it comes to the amount of screen time, responsible online behavior, and accessing "appropriate" digital content, it is still challenging to manage what children are doing when parents or other adults are not present and/or supervising. There are several existing solutions that allow parents to manually input data or content they would like to restrict their children from accessing. This manual permissions setting leaves room for human error. For example, a parent can overlook certain content, forget to restrict access to applications, or even unknowingly grant a child access to inappropriate material. As children grow and learn more about the technology they are using, it may become difficult for parents to determine what those restrictions should be. Updating permissions as a child matures can be burdensome. Even if a parent takes all the precautions to protect their child from harmful content, without making any manual errors, children often find ways to bypass the restrictions set in place. Further, parental preferences regarding the control of their children's digital content access varies among parents. Accordingly, managing access to digital content can be technically challenging.

Embodiments of the present invention address such technical challenges by managing access to digital content automatically. In one or more embodiments of the present invention, biometric evaluation, such as facial recognition, audio recognition, and other techniques are used to automatically determine the age of a user and authorize/restrict access to digital content based on that determination. Further, one or more embodiments of the present invention facilitate dynamically updating a set of rules used to authorize/restrict the access to the digital content for the user based on a tolerance score. Accordingly, not only is the authorization/restriction of the access automated, but also updating the rules used to automate the permission allocation is automated rather than relying on manual and static permission settings. One or more embodiments of the present invention also use other factors in deciding the access permission, such as, location, time of the day, and the like.

Embodiments of the present invention can automatically set parental controls or restrict access to certain content based on the biometrics of a child, location, time of day, and other collected data. According to one or more embodiments of the present invention, the permissions can be granted across shared devices. One or more embodiments of the present invention facilitate differentiating users of the devices and adjusts the experience based on biometrics and other data.

FIG. 1 depicts a system that manages digital content access for a family according to one or more embodiments of the present invention. The system 100 includes a content filtering system 120, a media device 140, a content source 130, and a content attributes source 150.

The media device 140 can be any media playback device, such as a television, an audio playback system, a disk player, a music player, a phone, a tablet computer, a gaming console, a laptop computer, a desktop computer, a media server, or any other electronic device that can access digital content 132 for playback. The media device 140 can access the content 132 from a storage device (not shown). The storage device can be internal to the media device 140, for example, a hard disk, a flash memory, or any other type of storage device. Alternatively, or in addition, the media device 140 can access the content 132 from an external device, such as a disk that can be plugged/inserted into the media device 140, a remote server (e.g. streaming service provider), and the like.

It should be noted that although only one media device 140 is shown, in one or more examples, the system 100 can include multiple media devices 140.

The content 132 can be any type of digital content, such as an image, an audio, a slideshow, a document, a video, a streaming content, a website, or any other digital content that the media device 140 can render.

The content attribute repository 150 can provide attributes 152 associated with the content 132. The content attribute repository 150, although shown as a separate block, can be part of the content source 130 and/or the media device 140. In one or more examples, the content attribute repository 150 includes an application programming interface that facilitates providing the attributes 152 of the content 132 when requested with an identification of the content 132. The content attribute repository 150 can include one or more sources of the attributes 152. For example, the content attribute repository 150 can include separate websites that provide separate portions of the attributes 152.

The content attributes 152 can include a title, a runtime, names of the cast, a description, and other such information about the content 132. The content attributes 152 can further include information about age-rating of the content 132, for example, R (restricted), PG (parental guidance suggested), NC-17 (no one 17 and under admitted), and so on. The content attributes 152 can further include one or more reasons for the rating in natural language, such as "violence", "language", "adult content", and the like. The content attributes 152 can further include a review of the content 132 from one or more review sources or reviewers.

In one or more examples, the sources of the attributes in the content attributes repository 150 can be configured by a user. For example, the source from which age-rating for the content 132 is obtained can be selected from one or more sources or manually provided.

The content filtering system 120 manages digital content access for a group of users, collectively referred to as a "family" 110. The content filtering system 120 can be part of the media device 140, in one or more examples, although shown as a separate block in FIG. 1. Alternatively, or in addition, the content filtering system 120 can be a separate device from the media device 140, where the media device 140 communicates with the content filtering system 120 via an application programming interface or any other communication protocol.

When any user from the family 110 requests to access the content 132 from the content source 130, the content filtering system 120 determines if the requesting user has permission to access the content 132. The content filtering system 120 can assign respective accounts to each user from the family 110. Depending on the age of a user the account can be a 'restricted account' 124A, 124B (collectively referred to as 124) or an 'unrestricted account' 122. The restricted account 124 has to seek permission prior to accessing the content 132. The unrestricted account 122 can access the content 132 without first seeking permission.

In the depicted example, the family 110 includes an unrestricted user 112 that is associated with the unrestricted account 122. For example, the unrestricted user 112 can be an adult, such as a parent, that can access the content 132 without seeking permission. Further, the depicted family 110 includes a first restricted user 114A associated with the first restricted account 124A, and a second restricted user 114B associated with the second restricted account 124B. For example, the restricted users 114A, 114B (collectively referred to as 114) can be children (under age of a predetermined threshold like 18, 21, and the like). The ages of the first restricted user 114A and the second restricted user 114B can be different and accordingly, the permissions that the two users receive can be different.

The content filtering system 120 grants permissions to the restricted users 114 automatically based on a set of rules 125. The rules 125 can be configured by the unrestricted user 112. A rules manager 126 automatically configures the rules 125. While the rules manager 126 is shown as part of the content filtering system 120 in FIG. 1, in one or more embodiments of the present invention, the rules manager 126 can be a separate device that communicates with the content filtering system 120 to automatically configure the rules 125. In one or more examples, the rules manager 126 uses machine learning, such as a neural network, or any other machine learning technique to automatically learn and adjust the set of rules as per the liking of the family 110.

Figure 2:
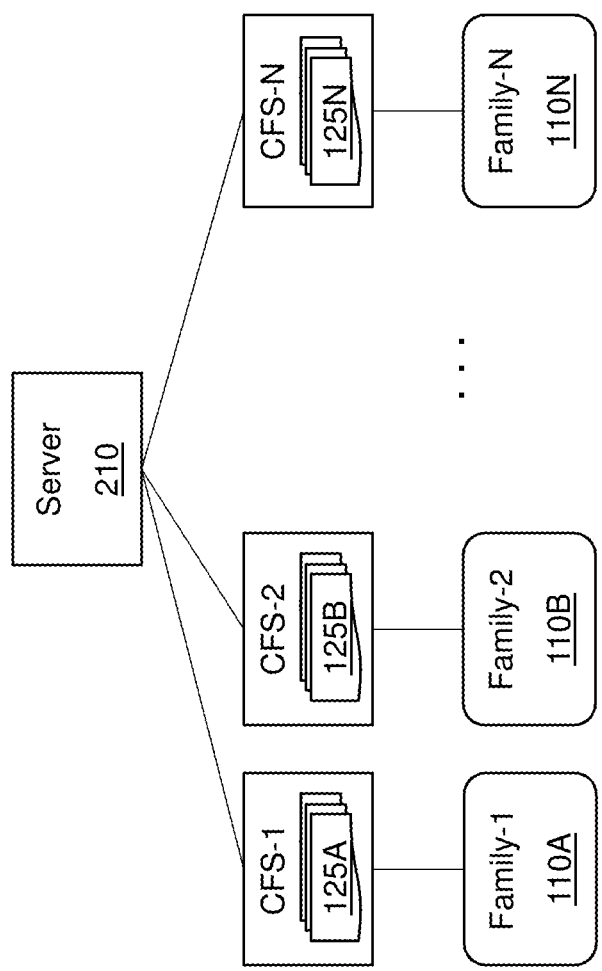
FIG. 2 depicts a system for managing access to digital content according to one or more embodiments of the present invention.

FIG. 2 depicts a system for managing access to digital content according to one or more embodiments of the present invention. In the system 200 that is depicted, a server 210 communicates with multiple content filtering systems 120A-120N. Each of the content filtering systems 120A-120N manages digital content access for a respective family 110A-110N. A first content filtering system 120A can have a different set of rules 125A that it uses to manage the permissions for accessing the content 132 than the rules 125B used by a second content filtering system 120B. The first set of rules 125A and the second set of rules 125B are initially the same based on a set of default rules. For example, the server 210 can set the initial rules 125A-125N for the content filtering systems 120A-120N when each of the content filtering systems is initiated. As each of the content filtering systems 120A-120N learns, using machine learning, the family profile and/or tolerance score of the respective family 110A-110N, the sets of rules 125A-125N will vary from each other.

Accordingly, after a duration of time, the first set of rules 125A will be different from the second set of rules 125B, and so on. The difference in the sets of rules is because of the automatic learning and consequent updates performed by each of the content filtering systems 120A-120N.

Figure 3:
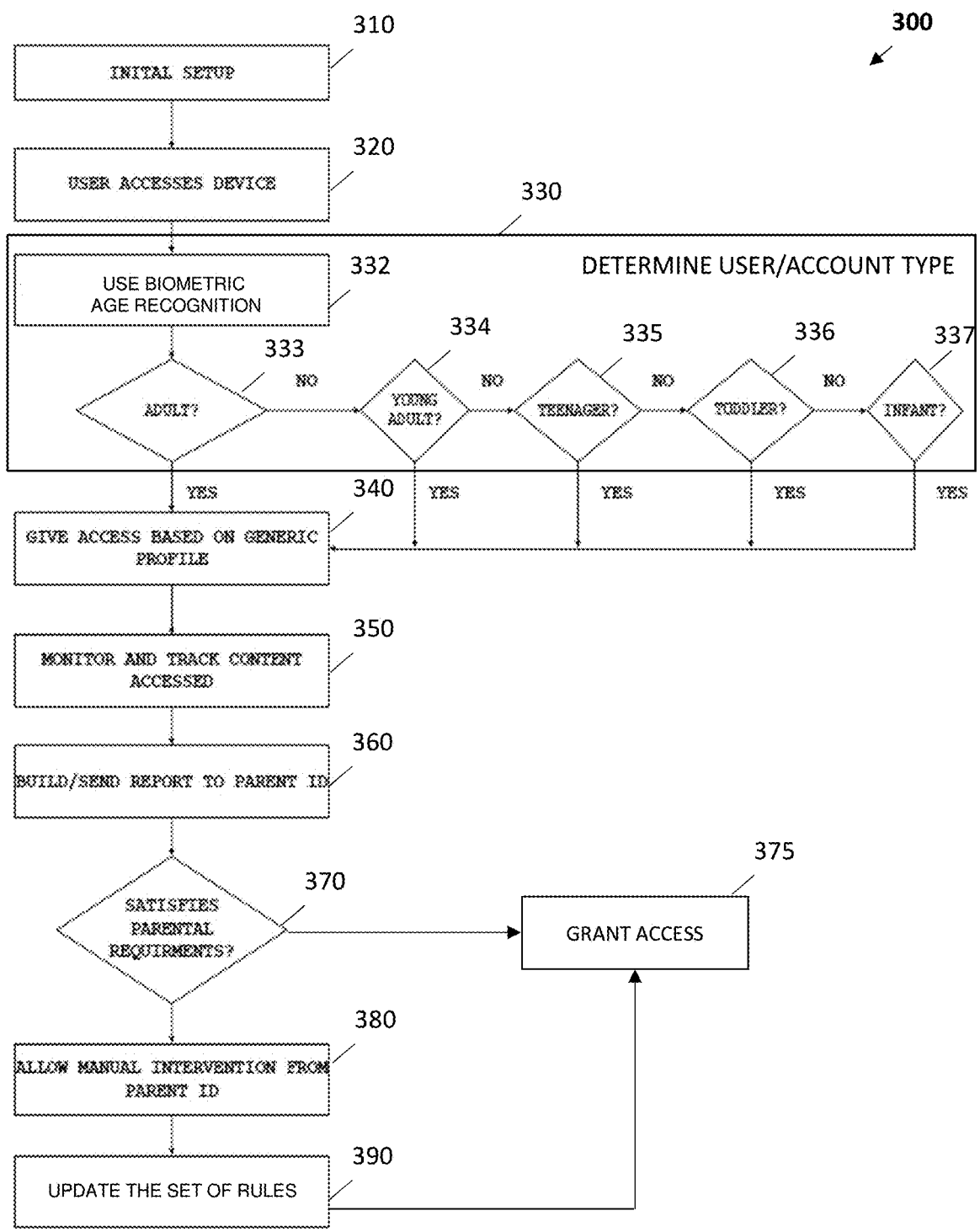
FIG. 3 depicts a flowchart of a method for automatically updating rules of a content filtering system according to one or more embodiments of the present invention.

FIG. 3 depicts a flowchart of a method for automatically updating rules of a content filtering system according to one or more embodiments of the present invention. In the depicted method 300, the content filtering system 120A is initially setup, at block 310. The initial setup can include creating a family profile for the family 110A that is associated with the content filtering system 120A. Further, one or more accounts, such as the restricted accounts 124, and the unrestricted account 122, can be created. Creating such accounts can include adding names, ages, and other demographic information of the users associated with the accounts. Additionally, the initial setup includes setting up the set of rules 125A using default values.

In one or more examples, the server 210 can provide the initial set of rules 125A. The initial set of rules 125A provided by the server 210 can depend on an input received from the content filtering system 120A. For example, the content filtering system 120A can indicate a "type" of the set of rules 125A to be setup initially. For example, the types can include "strict", where precise age limits and other restrictions associated with the content are used by the content filtering system 120A; "on demand" where the unrestricted user 112 is requested for permission each time the content 132 is requested, and other such types.

The set of rules 125A can further include identification of location(s), timing(s), and content source(s) 130. For example, the content filtering system 120A can automatically set time limits for the restricted accounts 124 according to one or more categories. For example, the content filtering system automatically allocates an amount of time the restricted account 124A (e.g. a child) can spend on particular type of content 132. For example, e-books may be limited to 60 minutes, entertainment videos (e.g. movies) may be limited to 35 minutes, etc.

Further, the content filtering system 120A can automatically restrict access to the content 132 based on location, time of day, and other parameters. For example, at a particular time duration, such as just after school (e.g. 4 PM-5 PM), the content filtering system 120A may automatically restrict access to the content 132 if it is deemed not related to homework, projects, research, etc. Such a determination can be based on the type of the content 132, for example, entertainment videos. In another example, if the media device 140 is used at a predetermined location, the content filtering system 120A restrict access to particular types of the content 132. For example, if the media device is used in a school, the content 132 that is accessible can be restricted to educational content. The content filtering system 120A can further limit playback attributes that can be controlled during the content playback based on the time and/or location. For example, audio volume, video brightness, video size, video duration, and other such attributes can be controlled.

In one or more examples, both the time and the location are used in combination to restrict the content 132 that is accessible. For example, during a dinner (determined by time) at a restaurant (determined by location), the volume of the content may be restricted to a certain level by the content filtering system 120A. Alternatively, or in addition, during a religious service time, which can be a predetermined timing at a predetermined location (e.g. church), the volume, brightness, and content type may be restricted. The set of rules 125A can include the predetermined locations, times, and other such parameters that restrict the content 132 being accessed. The locations and times can be different for each account in the family 110.

The initial setup can include configuring up other settings associated with the content filtering system 125A, such as content sources 130 to monitor, content attribute repository 150 to use. The initial setup can further include associated one or more communication methods for the accounts in the family 110 so that the content filtering system 120A can request and receive permissions from the unrestricted account 122, for example.

The method 300 further includes detecting when a user accesses the media device 140, at block 320. The method 30 further includes determining a user/account type of the user that is accessing the media device 140, at block 330.

It should be noted that the example depicted in FIG. 3, and described herein, is about a family for restricting content based on age limits for children. However, in other examples, embodiments of the present invention can be used in other scenarios where content is restricted based on a type of user, where the type is based on a role in an organization, a grade in a school, a payment level associated with the user (e.g. basic user, premium user etc.), and other such categorizations.

Referring to the example in FIG. 3, determining the type of user can be performed automatically by the content filtering system, at block 330. For example, the content filtering system 130 uses biometric recognition to identify the user. The biometric recognition can include facial recognition, audio recognition, and other biometric recognition for determining an age group of the user that is using the media device 140, at block 332. The content filtering system 120A estimates the approximate age of the restricted user 114A based on the biometrics such as facial feature recognition, voice feature recognition, and the like.

For example, the content filtering system 120A determines if the restricted user 114A is an adult (17+ years old), a young adult (16-17 years old), a teenager (13-15 years old), a toddler (5-12 years old), or an infant (0-4 years old), at 333, 334, 335, 336, and 337.

Based on the categorization, the content filtering system 120A gives the restricted user 114A access to the content 132 according to a profile associated with the category that the restricted user 114A is categorized into, at block 340. The profile that is used will be associated with the corresponding restricted user account 124A. During a predetermined number of initial runs of the content filtering system, the profile uses the set of rules 125A according to the initial setup (default rules).

Further, the method 300 includes tracking and monitoring the content 132 that is accessed by the restricted user 114A, at block 350. The monitoring includes determining content attributes 152 associated with the content 132, and determining a correlation between the content attributes 152 and the parameters of the restricted user 114A. For example, the content attributes 152 can indicate that the content 132 is rated as "PG" for violence, and the restricted user 114A, who is a 10 year old user that is permitted to access the content 132. Alternatively, or in addition, during another run, the 10 year old restricted user 114A is not permitted to access the content 132 that is also rated as "PG" for adult language. The content filtering system 120A can also track time and location at which the content 132 is accessed and permitted (or restricted) for the user 114A.

The method 300 further includes providing a report, to the unrestricted user 112 (e.g. parent), about the content 132 that was accessed by the restricted user 114A during a predetermined time, at block 360. For example, the report can be a daily report, a weekly report, or cover content access over such a predetermined duration. The unrestricted user 112 can determine whether any changes to the permissions are required based on the report or if the permissions granted (restricted) satisfy the unrestricted user's 112 expectations, at block 370. If the content 132 satisfies the rules 125A setup for the restricted account 124A, access to the content 132 is granted by the content filtering system 120A, at block 375.

If required, the unrestricted user 112, based on the received report, can change the permission granted/restricted to the restricted user 114A to access one or more content, at block 380. For example, the content filtering system 120A may have prevented the restricted user 114A from accessing the content 132, and if the unrestricted user 112 deems that such restriction is not necessary, s/he may update the content filtering system 120A to allow the restricted user 114A to access to the content 132 in the future. The update may include the unrestricted user 112 selecting a user interaction, such as a user-interface button, for example, to authorize further access to the content 132 by the restricted user 114A. In one or more examples, the unrestricted user 112 can change the permission from granted to restricted, if s/he deems that the content 132 is not appropriate for the restricted user 114A.

The content filtering system 120A, based on the change made by the unrestricted user 112, updates the set of rules 125A, at block 390. Updating the set of rules 125A includes updating a neural network in one or more examples. For example, the content filtering system 120A includes the rules manager 126, which can use a neural network for applying the set of rules 125A. Updating the rules includes updating one or more weights associated with the set of rules 125A. For example, the neural network can use the weights to program one or more synapses and/or neurons. By updating the weights of the neural network, the rules manager 126 can change the way the set of rules 125A are applied to filter the content. The set of rules 125A that are updated are for the restricted account 124A. In one or more examples, the second restricted account 124B is automatically updated if the second restricted user 114B is in the same category (age group) as the first restricted user 114A. Accordingly, the content filtering system 120A is able to automatically set controls based on the age of the users.

Updating the set of rules 125A further includes updating a tolerance score for the restricted account 124A. The tolerance score indicates a threshold of content type that the unrestricted user 112 allows the restricted user 114A to access. For example, the tolerance score indicates a tolerance level for parents (unrestricted user) if a child (restricted user) accesses a file, and the parent gives the access.

The tolerance score can be a single value or a vector of values. For example, the tolerance score can be a vector of one or more content attributes 152 representing thresholds for each of the attributes. For example, the vector can include threshold values for each of violence, nudity, language content, duration, and other such attributes. Alternatively, or in addition, the tolerance score can be a single value that represents the values of the list of attributes, such as the one above. For example, the single value can be computed as an average, a geometric mean, or any other statistic type.

The content filtering system 120A when operating at least for a predetermined number of times (e.g., 5, 7, etc.) learns preferences of the family 110A. For example, the neural network of the content filtering system 120A is trained with the weights to be used for applying the set of rules 125A. Further, the set of rules 125A are also updated, such as to identify what times and/or locations are to be used for specific restrictions, and the restrictions themselves.

Figure 4:
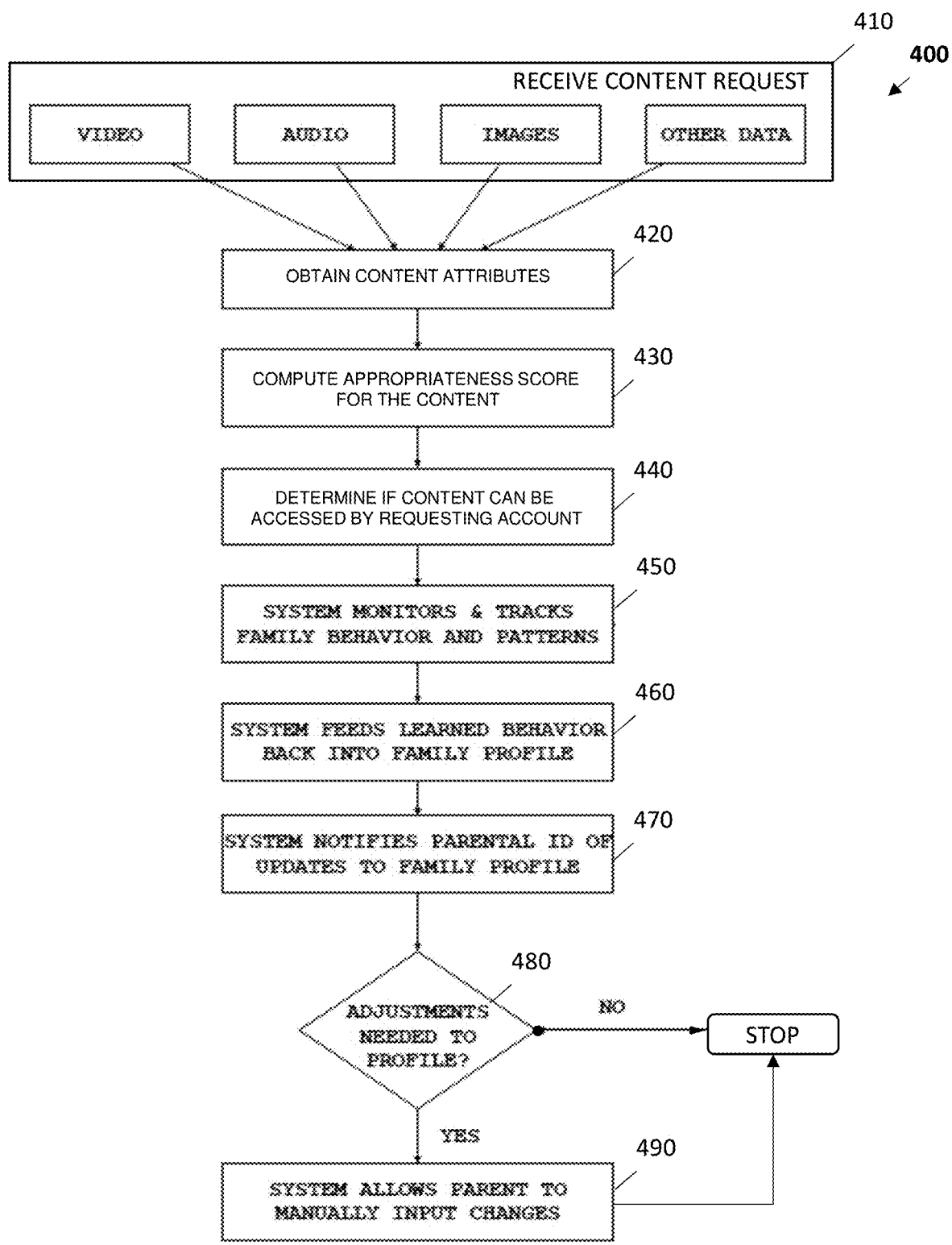
FIG. 4 depicts a flowchart of a method to grant/restrict access to content to a user according to one or more embodiments of the present invention.

FIG. 4 depicts a flowchart of a method to grant/restrict access to content to a user according to one or more embodiments of the present invention. The method 400 depicted is implemented by the system 100 to grant/restrict access to the content 132 when a request to access the content 132 is received from the restricted account 124A. The method 400 begins with receiving a request to access the content 132 via the media playback device 130 from the restricted account 124A, at block 410.

The method 400 further includes obtaining the content attributes 152 for the requested content 132, at block 420. The content attributes 152 are obtained from the content attributes repository 150 based on an identifier of the content 132, such as a title, a unique identifier, cast, or any other parameter of the content.

The method further includes computing an appropriateness score for the content 132, at block 430. The appropriateness score is specific to the family 110, and moreover to the restricted account 124A. The appropriateness score, in one or more examples, can be a vector of the content attributes 152.

Alternatively, or in addition, the appropriateness score is a single value that is based on the content attributes 152. For example, the appropriateness score can be an average, a weighted average, or any other statistic that is based on quantitative representation of the content attributes 152. For computing the appropriateness score, the content filtering system 120A, in one or more examples, parses the natural language associated with the content 132. For example, the content attributes 152 can include the reasons for the age-rating that the content filtering system 120A parses and determines a corresponding quantitative value to be used for computing the appropriateness score. The information such as user reviews from the content attributes repository 150 is also converted to quantitative measures. For example, number of reviews that indicate whether the content 132 is appropriate for the age group of the restricted user 114A that is associated with the requesting restricted account 124A can be used as a measure. In other embodiments of the present invention, the conversion can be different. In one or more examples, the natural language parsing can be performed using natural language parsing services.

In one or more examples, a pre-trained neural network or any other type of machine learning algorithm is used, which is trained using tagged data such as videos, audio files, and images. The machine learning algorithm can be trained using restricted content (e.g., mature content), appropriate content (e.g., kid-friendly content).

The content filtering system 120A determines if the content 132 can be accessed by the requesting restricted account 124A based on the computed appropriateness score and the tolerance score associated with the restricted account 124A, at block 440. For example, the content 132 is accessible by the restricted account 124A if the tolerance score associated with the restricted account 124A is less than or equal to the appropriateness score that is computed. In other embodiments of the invention, the tolerance score has to be greater than or equal to the appropriateness score for the content 132 to be accessible.

The content filtering system 120A monitors and tracks the behavior of the restricted user 114A and the unrestricted user 112, at block 450. For example, if the content 132 is deemed as accessible, the content filter system 120A monitors that the content 132 is viewed, and includes identification and the reason/cause regarding why the content 132 was made accessible to the restricted user 114A via the restricted account 124A.

If the unrestricted user 112 changes the accessibility of the content 132 upon receiving the periodic report, the content filtering system 120A feeds the learned behavior into the family profile, at block 460. As described herein, the learned behavior can include updating the neural network (or other machine learning technique used) and in turn updating the application of the rules 125A.

In the case that the content 132 is not accessible, the restricted user 114A can communicate with the unrestricted user 112 via the content filtering system 120A. For example, the restricted user 114A, via the restricted account 124A, can send a request to the unrestricted user 112, via the unrestricted account 122. If the unrestricted user 112 makes the content 132 accessible in response, the content filtering system 120A feeds the learned behavior into the family profile, at block 460. As described herein, the learned behavior can include updating the neural network (or other machine learning technique used) and in turn updating the application of the rules 125A.

If the unrestricted user 112 does not change the accessibility of the content 132 for the restricted user 114A, the content filtering system 120A can continue without adjusting the set of rules 125A. Alternatively, or in addition, the content filtering system 120A can update the weights of the neural network to confirm the learning from a previous run. For example, in the previous run the content filtering system 120A may have restricted access to a first content 132 with a first set of content attributes 152 and consequently updated the neural network in response to the unrestricted user 112 allowing the access. The present content 132 may have the same set of content attributes as the first content 132 from the previous run and the unrestricted user 112 accepting the grant of access in the present run can be deemed as a confirmation that the content filtering system 120A updated the neural network as desired.

The content filtering system 120A notifies of any updates to the neural network and the set of rules 125A to the unrestricted user 112, at block 470. For example, the notification can be part of the periodic report that is generated. Alternatively, or in addition, the notification of the updates can be sent every time the set of rules 125A are adjusted.

The unrestricted user 112 can decide to adjust the set of rules 125A at this time, at block 480. If an adjustment is not made the method 400 repeats itself from monitoring the system behavior, at block 460. Alternatively, if the unrestricted user 112 desires to, s/he can adjust the set of rules 125A manually, at block 490.

As described herein, based on the automatically adjusted set of rules 125A, embodiments of the present invention can determine when the content 132 is, and is not accessible by the restricted users 114, even when content attributes 152, e.g., comments or age-ratings suggest otherwise. The automatic adjustment of the rules is performed based on parental override, which allows parent(s)/unrestricted account(s) to take control and adjust settings manually. Embodiments of the present invention accordingly facilitate a generic content filtering system, which over time adjusts to the need of the family that is using the content filtering system by tracking the user behavior and learning the user preferences automatically.

Figure 5:
FIG. 5 depicts an example depiction of tolerance scores for different types of contents according to one or more embodiments of the present invention.
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:

FIG. 5 depicts an example depiction of tolerance scores for different types of contents according to one or more embodiments of the present invention. Here, the tolerance score computation takes into account different age-ratings 520 from different geographies, such as Japan, Europe, USA, and the like. The tolerance score 510 depicted is a single value, however, as described herein, in one or more embodiments of the present invention, the tolerance score 510 can be a vector of values representing different content attributes 152.

Figure 6:
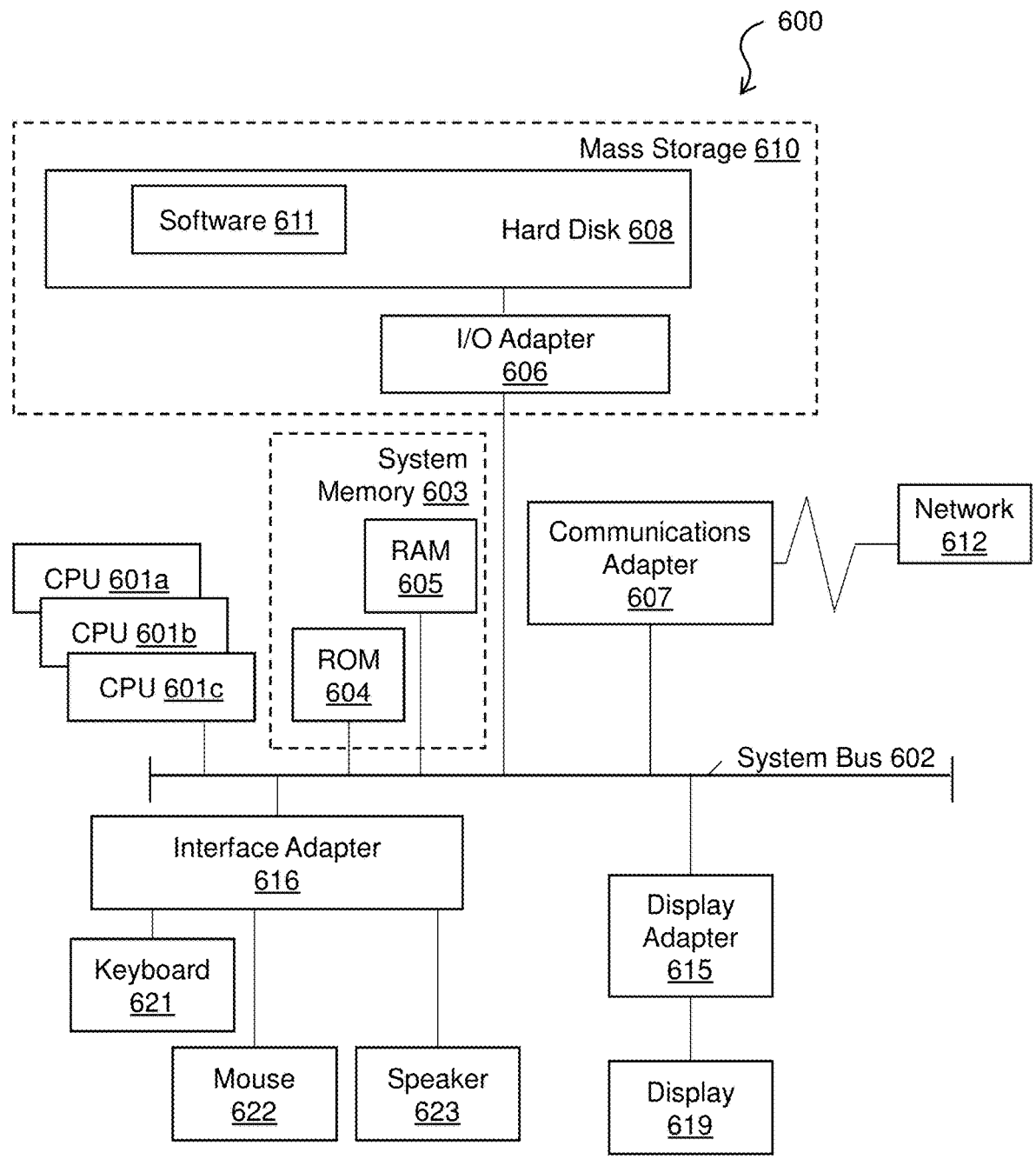
FIG. 6 depicts a computer system according to one or more embodiments of the present invention.

Turning now to FIG. 6, a computer system 600 is generally shown in accordance with an embodiment. The computer system 600 can be the server 210, the media device 140, the content filtering system 120, or any other device in the system 100 or a device that is described herein. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601*a*, 601*b*, 601*c*, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Embodiments of the present invention facilitate estimating an approximate age of a child (restricted user) based on biometrics such as facial recognition. Further, one or more embodiments of the present invention can automatically configure parental controls, such as the set of rules, based on the age of the user determined via the biometrics, or manually input by the parent (unrestricted user). Embodiments of the present invention can automatically set time limits for accessing particular types of content using an automatic categorization and/or curation of content. For example, embodiments of the present can automatically allocate the amount of time a child can spend on certain activities (e.g. playing games, watching movies etc.) on the media device. Further, embodiments of the present invention can restrict access to certain content based on location, time of day, and other data.

Embodiments of the present invention can determine when content is, and is not appropriate for the child, even when comments or application ratings suggest otherwise. The appropriateness varies from one child to another, even if the age of the two children is the same. The appropriateness is determined by learning the tolerance score for the particular family that is associated with the content filtering system. In one or more examples, embodiments of the present invention facilitate for parental biometric override, which allows parents to take control and adjust settings manually. Embodiments of the present invention begin the content filtering using a generic system and over time adjusts to the need of the family based on learned user behavior.

According to one or more embodiments of the present invention, a content filtering system can automatically set parental controls or restrict access to certain content based on facial biometrics of a child, location, time of day, and other collected data. In the case the media device is shared among multiple restricted users, one or more embodiments of the present invention is able to differentiate the restricted users of the media device and adjust the experience based on biometrics and other data automatically.

The present invention may be a system, a method, and/or a computer program product at any possible technical detail level of integration. The computer program product may include a computer-readable storage medium (or media)

having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A computer-implemented method comprising:
    creating a family profile for an automatic content filtering system, the family profile identifying a restricted account and a non-restricted account, wherein the restricted account has a tolerance score that indicates a threshold of content type that the unrestricted account allows the restricted account to access;
    restricting, by the content filtering system, access to digital content according to the tolerance score, the restricting in response to receiving a request from the restricted account to access the digital content;
    updating, by the content filtering system, a set of rules in response to the unrestricted account authorizing the restricted account to access the digital content that was restricted by the automatic content filtering system; and
    in response to updating the set of rules, changing a set of weights of a neural network corresponding to the set of rules, wherein the set of weights is used by the neural network to compute the tolerance score of a restricted user associated with the restricted account, the neural network determines the tolerance score based on one or more content attributes associated with the set of rules, and wherein the neural network updates the weights as an age of the restricted user changes.

2. The computer-implemented method of claim 1, wherein the restricted account is associated with the restricted user who is below a predetermined age threshold.

3. The computer-implemented method of claim 2, wherein the unrestricted account is associated with a user who is above the predetermined age threshold.

4. The computer-implemented method of claim 1, wherein the set of rules is automatically populated for the restricted account based on the age of the restricted user associated with the restricted account.

5. The computer-implemented method of claim 4, wherein the age of the restricted user is automatically determined based on biometrics of the restricted user.

6. The computer-implemented method of claim 1, further comprising:
    in response to the content filtering system restricting access to the digital content:
        sending by the restricted account an authorization request to the unrestricted account;
        displaying, to an unrestricted user associated with the unrestricted account, a cause of the restriction; and
        displaying, to the unrestricted user, options to continue the restriction or to authorize the restricted account to access the digital content.

7. The computer-implemented method of claim 6, wherein the cause of the restriction comprises one or more rules from the set of rules.

8. The computer-implemented method of claim 1, wherein restricting the digital content comprises:
    computing an appropriateness score for the digital content; and
    comparing the appropriateness score with the tolerance score.

9. The computer-implemented method of claim 8, wherein the appropriateness score is computed based on a plurality of content attributes that are automatically accessed from one or more databases.

10. A system comprising:
    a memory; and
    a processor coupled with the memory, the processor configured to perform a method comprising:
        identifying a restricted account and a non-restricted account, wherein the restricted account has a tolerance score that indicates a threshold of content type that the unrestricted account allows the restricted account to access;
        restricting access to digital content according to the tolerance score in response to receiving a request from the restricted account to access the digital content;

updating a set of rules in response to the unrestricted account authorizing the restricted account to access the digital content that was restricted; and in response to updating the set of rules, changing a set of weights of a neural network corresponding to the set of rules, wherein the set of weights is used by the neural network to compute the tolerance score of a restricted user associated with the restricted account, the neural network determines the tolerance score based on one or more content attributes associated with the set of rules, and wherein the neural network updates the weights as an age of the restricted user changes.

11. The system of claim 10, wherein the set of rules is automatically populated for the restricted account based on the age of the restricted user associated with the restricted account.

12. The system of claim 10, wherein the method further comprises:

in response to access to the digital content being restricted:

sending by the restricted account an authorization request to the unrestricted account;

displaying, to an unrestricted user associated with the unrestricted account, a cause of the restriction; and displaying, to the unrestricted user, options to continue the restriction or to authorize the restricted account to access the digital content.

13. The system of claim 10, wherein restricting the digital content comprises:

computing an appropriateness score for the digital content; and comparing the appropriateness score with the tolerance score.

14. A computer program product comprising a memory storage device having computer executable instructions stored thereon, the computer executable instructions when executed by a processor cause the processor to perform a method comprising:

identifying a restricted account and a non-restricted account, wherein the restricted account has a tolerance score that indicates a threshold of content type that the unrestricted account allows the restricted account to access;

restricting access to digital content according to the tolerance score in response to receiving a request from the restricted account to access the digital content;

updating a set of rules in response to the unrestricted account authorizing the restricted account to access the digital content that was restricted; and in response to updating the set of rules, changing a set of weights of a neural network corresponding to the set of rules, wherein the set of weights is used by the neural network to compute the tolerance score of a restricted user associated with the restricted account, the neural network determines the tolerance score based on one or more content attributes associated with the set of rules, and wherein the neural network updates the weights as an age of the restricted user changes.

15. The computer program product of claim 14, wherein the set of rules is automatically populated for the restricted account based on the age of the restricted user associated with the restricted account.

16. The computer program product of claim 14, wherein the method further comprises:

in response to access to the digital content being restricted:

sending by the restricted account an authorization request to the unrestricted account;

displaying, to an unrestricted user associated with the unrestricted account, a cause of the restriction; and displaying, to the unrestricted user, options to continue the restriction or to authorize the restricted account to access the digital content.

17. The computer program product of claim 14, wherein restricting the digital content comprises:

computing an appropriateness score for the digital content; and comparing the appropriateness score with the tolerance score.

* * * * *